March 25, 1958     O. C. CRIPE     2,827,917
SWIVEL TOP FLOAT VALVE
Filed March 4, 1955     2 Sheets-Sheet 1
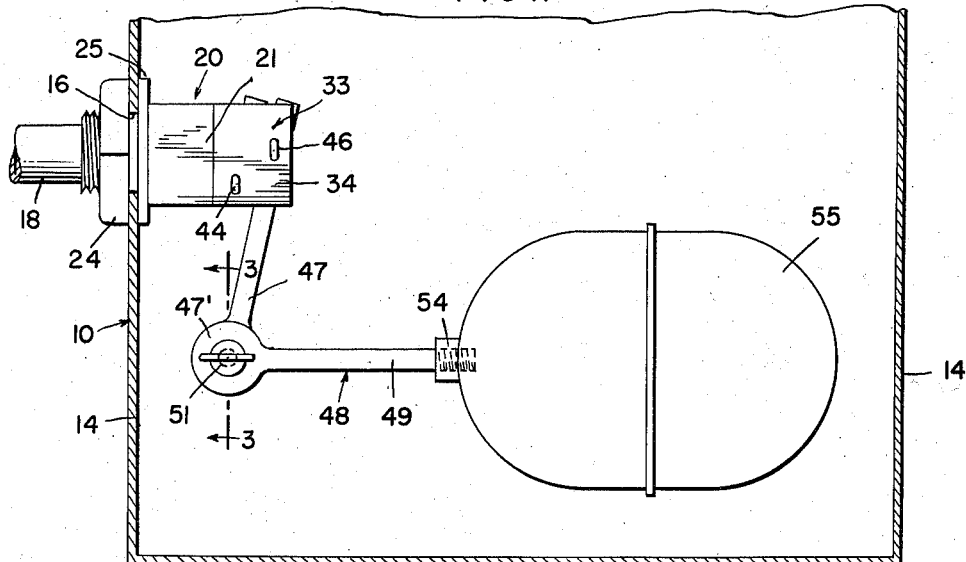
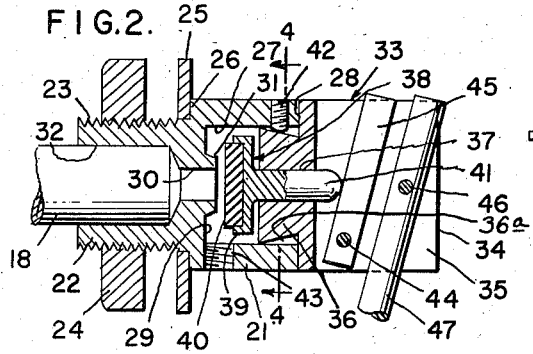
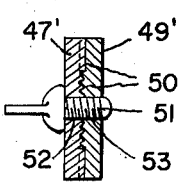
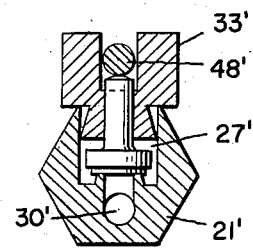
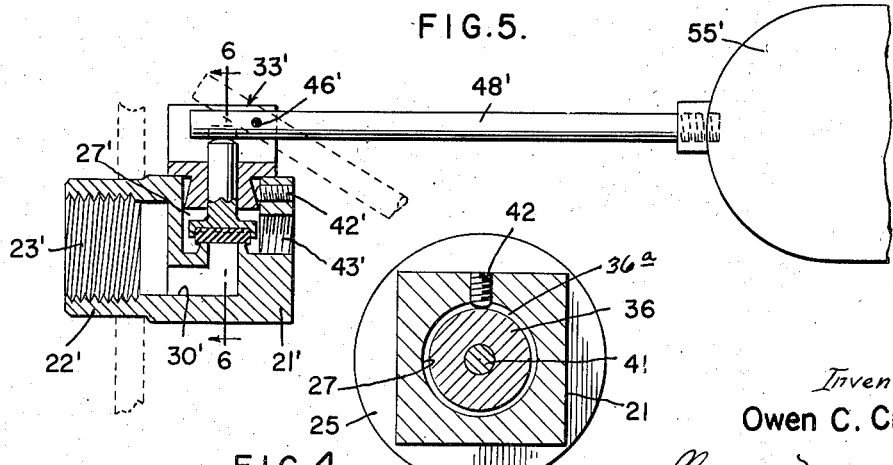
Inventor
Owen C. Cripe
ATTYS

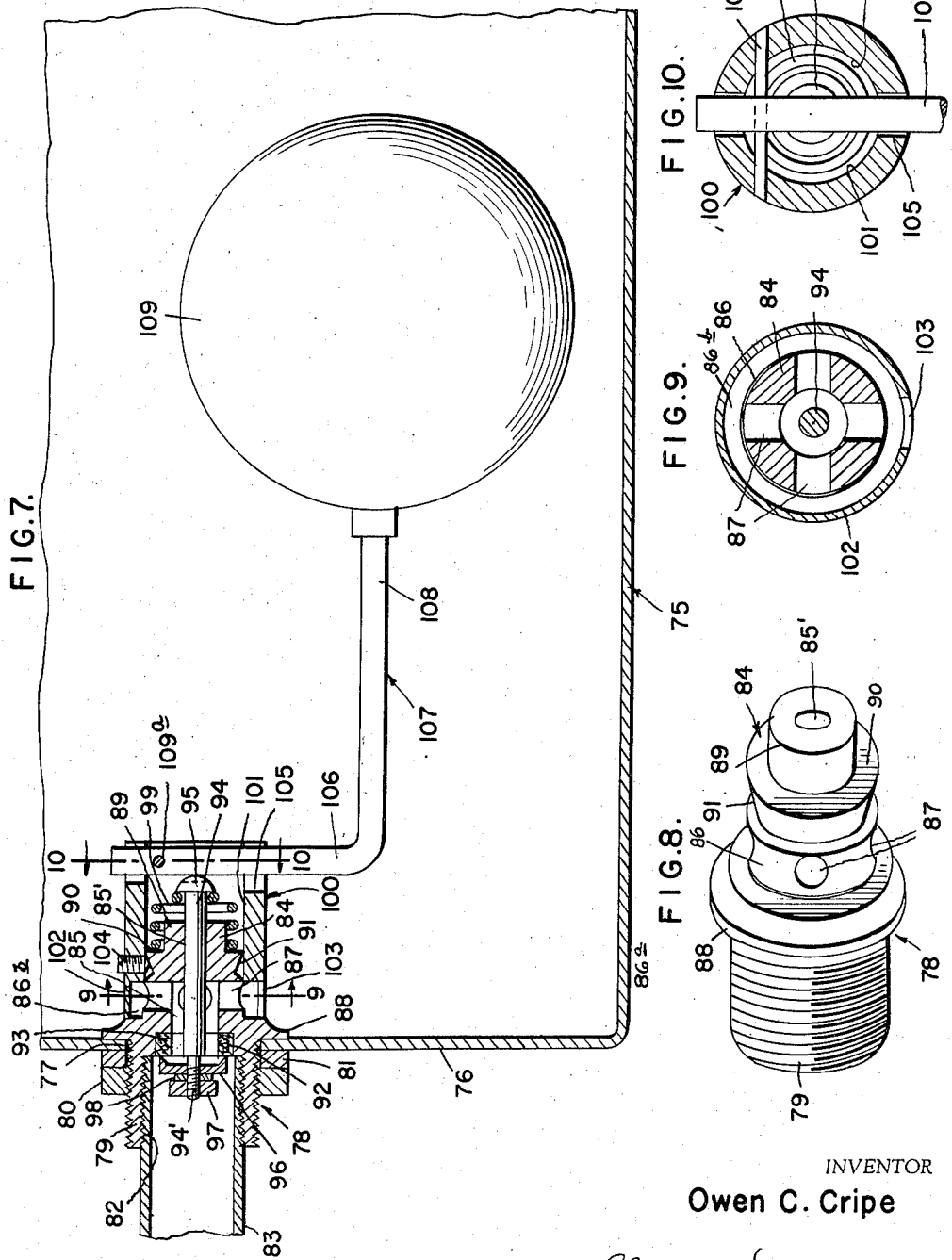

United States Patent Office 2,827,917
Patented Mar. 25, 1958

2,827,917

SWIVEL TOP FLOAT VALVE

Owen C. Cripe, Wilton, Ind.

Application March 4, 1955, Serial No. 492,204

17 Claims. (Cl. 137—443)

This invention relates to improvements in float actuated or controlled valves. In connection with the employment of float operated valves in tanks, such as flush tanks, animal watering troughs and the like, in installing such valves and the floats for the same, it may be found desirable to set the float arm at a particular angle for the most efficient control or actuation of the valve. Conventional float actuated or control valves are not customarily designed for altering the angular disposition of the float rod or arm with respect to the valve unit and, accordingly, if the space provided for the float body is not sufficient, it becomes necessary either to relocate the valve unit which involves the formation of a different point of entry for the water supply pipe into the tank or the float rod or arm must be angulated by bending or in some other manner altered so that the float can function properly.

A particular object of the present invention is, accordingly, to provide, in a manner as hereinafter set forth, a new and novel float operated valve unit wherein the part thereof to which is attached the valve element actuating float rod or arm, is adapted to be turned, rotated or swiveled so that the arm or rod attached to the float element may be extended in any desired direction to place the float in the most advantageous position.

Another object of the invention is to provide, in a manner as hereinafter set forth, a new and novel float actuated valve unit, wherein there is a fixed valve element enclosing housing which carries a rotatable or swivel head formed to provide a guide for the valve element stem, and to which head an end of the float rod or arm is operatively coupled to be turned with the head to extend in any desired direction therefrom.

A still further object of the invention is to provide, in a manner as hereinafter set forth, a new and novel float actuated valve unit or structure having a valve element and seat encasing chambered housing with a head carried thereby and providing a guide for the valve stem, wherein the said head is coupled to the housing by an undercut extension inserted into the chamber enclosing the valve element and a securing or set screw is provided which engages a side of the undercut extension to lock the head against turning or, when loosened slightly but not sufficiently to permit the extension from being removed, will permit the swiveling of the head for a desired setting thereof to dispose the float carrying arm, which is attached to the head, in a desired position.

Another object of the present invention is to provide, in a manner as hereinafter set forth, a float actuated valve carrying a rotatable or swivel head to which the control float is connected, which valve is constructed in a novel manner to be self-closing under the pressure of fluid when the control float is in a fluid-elevated or raised position.

Still another object of the invention is to provide a valve structure of the character above set forth which is constructed in a novel manner whereby, in addition to being self-closing, it is so designed that when it is in open position the seat thereof will be washed clean by the liquid passing therethrough.

Still another object is to provide a float controlled valve structure wherein the self-closing action is effected by the pressure of liquid on the valve element which is aided by a spring element and which spring element is compressed by rod means connected with the control float, when the float is in a lowered position and when in such lowered position the rod functions to shift the valve element to open position against fluid pressure.

The invention will be best understood from a consideration of the following detailed description taken in connection with the accompanying drawings forming a part of the specification with the understanding that the invention is not confined to a strict conformity with the showing of the drawings but may have minor changes or modifications made therein so long as such changes or modifications mark no material departure from the salient features of the appended claims.

In the drawings:

Fig. 1 illustrates a tank body in vertical section showing the valve unit of the present invention in a preferred embodiment secured to a wall of the tank and having an articulated float arm operatively connected therewith.

Fig. 2 is a longitudinal section on an enlarged scale through the valve unit showing the attachment of an end of one part of the articulated arm to the swivel head.

Fig. 3 is a detail section taken substantially on the line 3—3 of Fig. 1.

Fig. 4 is a transverse section taken substantially on the line 4—4 of Fig. 2.

Fig. 5 is a longitudinal section on an enlarged scale through another embodiment of the valve structure showing the valve stem directed laterally from the head and showing a one-piece float arm.

Fig. 6 is a sectional view taken substantially on the line 6—6 of Fig. 5.

Fig. 7 illustrates another embodiment of the valve structure showing the same mounted in a tank wall for use, in a similar manner to Fig. 1.

Fig. 8 is a view in perspective of the valve element enclosing housing body and the undercut or grooved lug which is formed integral therewith.

Fig. 9 is a transverse section taken substantially on the line 9—9 of Fig. 7.

Fig. 10 is a section taken substantially on the line 10—10 of Fig. 7.

Referring now more particularly to the drawings, the numeral 10 generally designates a tank of any character, such as a flush tank, an animal watering trough or tank or any other structure where it is desired that water or other liquid be introduced thereinto and maintained at or constantly restored to a desired level when the liquid contents are drawn off either in small or large quantities. The tank is shown as comprising a bottom 12 and side walls 14 and one such side wall may be provided with a suitable opening 16 through which may be extended an element of the hereinafter described valve unit for attachment to a liquid supply pipe 18.

One embodiment of the present invention is illustrated in Fig. 1 as mounted upon a side wall 14 of the tank and is generally designated 20.

In the embodiment 20 of the present invention, there is provided a body 21 which may be of cylindrical or polygonal cross-section form, from one end of which extends the externally threaded mounting stem 22, the screw threads in the exterior surface of which are designated 23 and are designed to cooperate with a thread nut 24 by which the valve unit is secured in operative position on the tank wall.

As shown, when the valve unit is mounted, the threaded stem is extended through the wall opening 16 and on the inner side of the wall there may be placed around the stem 22 a suitable gasket 25 which will be compressed between the inner surface of the wall and the shoulder 26 which is formed by the provision of the stem 22 of smaller external diameter than the body 21 of which it forms a part. The nut 24 is drawn up tightly on the stem against the outside of the wall 14 to hold the valve unit rigidly in position in an obvious manner.

The body 21 is provided with a valve element encasing chamber 27 which has one side open as indicated at 28. In the present embodiment, this open side of the chamber is at the end of the body 21 opposite from the stem 22.

The bottom 29 of the chamber has a central passage 30 therethrough and, at its inner end, it is encircled by the annular valve seat web or flange 31.

The stem 22 is provided with the axle bore 32 which communicates with the passage 30 and into which is fixed an end of the liquid supply pipe 18.

The numeral 33 generally designates the swivel head which comprises the body 34 across and through which is formed a slot 35. From one end of the body 34 there extends the lug 36 which is of circular form and of an overall or maximum diameter approximately equaling the inside diameter of the circular chamber 27 into which it extends. This lug is circumferentially undercut forming the sloping shoulder face 36a. This undercut lug is of maximum diameter at the free end portion and tapers inwardly to a minimum diameter at the end where it joins the body 34 and this end of the body is adapted to position against the opposing end of the valve element housing body 21 when the valve unit is set up for use.

The lug 36 is provided with an axial passage 37 which forms a valve stem guide and this passage is aligned with the passage 30 and opens through the inner end of the lug and at its outer end it opens into the slot 35.

The numeral 38 designates the valve element which comprises the head or disc 39 carrying the packing 40 which is adapted to engage the flange seat 31. Extending from the side of the head 39 opposite from the packing 40 is the stem 41 which is slidably positioned in the guide passage 37 and projects into the slot 35 as illustrated. When the swivel head 33 is mounted on the housing body 21, the lug extends into the chamber 27 as shown so that the packing of the valve element is in close proximity to the seat 31 and the wall of the housing 21 is provided adjacent to the outer part of the chamber 27 with a suitable threaded bore to receive the set screw 42. This set screw when threaded inwardly engages the sloping side of the undercut lug 36 and thus securely holds the latter against withdrawal from the chamber 27.

It will be seen that the securing or set screw 42 may be loosened slightly so as to permit the turning of the head 33 without permitting the lug to be withdrawn from the valve element chamber.

Adjacent the inner end or bottom of the chamber 27, the side wall of the body 21 is provided with a threaded port 43 which forms liquid outlet for the discharge of liquid into the tank or in which may be fitted the threaded end of a suitable pipe, not shown, if this is found desirable.

Pivotally supported in the slot 35 of the swivel head on a transverse pivot pin 44 is an end of a thrust finger 45 which opposes and is normally in engagement with the outer end of the valve stem 41.

Extending transversely of the slot 35 in the longitudinal center of the swivel head is a pivot pin 46 upon which is mounted for swinging or rocking movement in the slot 35, one end of a short rod 47 which forms one part of a two part or articulated float arm which is generally designated 48 and the other part of which, in the form of a short rod, is designated 49. These two rod parts 47 and 49 are adjustably coupled together as illustrated and to provide for such adjustable coupling each has an end enlarged and flattened as indicated at 47' and 49' respectively and these flattened end parts are disposed in opposed relation and have interengaging toothed faces 50 to hold them against relative turning movement when they are drawn together by the threaded screw 51 which passes through aligned threaded openings 52 and 53 in the centers of the parts 48' and 49' as shown in Fig. 3.

The outer end of the rod part 49 of the arm has threadedly secured thereto as indicated at 54, a conventional float ball 55.

It will be seen from the foregoing that by locking the coupling screw 51 which connects the two parts of the articulated arm together the angular relation of the parts may be readily changed to suit the conditions under which the valve and float are installed. In the set-up illustrated, the slot 35 of a swivel head is vertically arranged so that the arm part 47 extends downwardly and the float, when it moves to its lowest position as by the emptying of the tank in any suitable manner, not shown, will effect the oscillation of the part 47 in a direction to permit the valve element to shift easily from the seat and thus admit liquid to the tank by way of the passage 30, the chamber 27 and the port 43. Obviously, when the tank fills and the float rises, oscillation of the arm will press the valve element onto the seat to shut-off the flow.

In the second embodiment illustrated in Fig. 5, the chambered body of the valve is designated 21' and the chamber therein, designated 27' opens laterally through a side of the body or at right angles to the direction in which the stem portion 22' projects from the body. In this second embodiment, the stem portion is shown as being internally screw threaded as indicated at 23' and such stem portion is of slightly reduced size or diameter as compared with the diameter of the body 21' to facilitate its installation into a tank wall opening where it may be secured by welding or in any other suitable manner.

The passage 30' leading from the axial passage in the stem 22' turns at right angles at its inner end and is directed into the chamber 27' along the axis of the latter chamber which is transversely of the body rather than longitudinally thereof as in the first described embodiment and, in this second embodiment, the outlet port leading from the chamber 27' and corresponding to the port 43 is designated 43' and extends in the longitudinal direction of the body rather than transversely as in the first embodiment.

In the second embodiment, the swivel head construction is substantially the same as in the first described embodiment and, accordingly, it is not believed that a detailed description of the same is required. This swivel head is here designated 33' and it differs from the head 33 only in the fact that there is no thrust element such as that shown in Fig. 2 and designated 45, against which the pivoted end of the float rod or arm bears. In this latter embodiment, the float rod or arm is in one-piece and is designated 48' and lies in the slot of the swivel head where it is mounted for rocking movement on the pivot pin 46'.

In the second embodiment, it will be seen that, when the unit is mounted on a tank wall, the float rod or arm, which carries at its outer end the float ball 55', will be horizontally extended and it may be set to extend parallel with the axis of the body 21 or it may be swung on the axis of the swivel head to any desired angular position where it can be retained by means of the set screw 42' in the obvious manner.

It will also be apparent that, in the first described embodiment, the articulated float arm can also be set at an angle by rotating the head 33 about its longitudinal axis.

Figs. 7 to 10, inclusive, illustrate another embodiment of the present invention wherein the valve element moves to open position against the pressure of fluid entering the valve. In this embodiment a similar coupling is employed between the head body to which the float arm is pivotally attached, and the valve element carrying body, as previously described, whereby the float arm may be set in a desired angular relation with the valve element by rotating the head and securing it after the desired angular position of the float rod is obtained.

In this third embodiment the numeral 75 designates the tank in one wall of which the valve structure is shown mounted and which wall is designated 76. This wall 76 is provided with an opening 77 to receive a portion of the main body of the valve structure as shown. Numeral 78 generally designates the main body or housing of the hereinafter described valve element. This main body comprises a cylindrical portion 79 which is adapted to extend through the opening 77 of the tank wall and is externally screw threaded as indicated to receive the securing nut 80 which is threaded thereon against a washer 81 interposed between the nut and the outer side of the housing wall. The housing 79 has the axial chamber 82 therein which opens through the outer end and is internally screw threaded to receive an end of a pipe 83 through which liquid is supplied to the valve. The inner end of the chambered housing body 79 carries the axially extending lug 84 and this lug has the axial flow passage 85 formed therein at the end thereof which joins the housing and this passage opens at one end into the chamber 82 of the housing and at its other end is of reduced diameter through a portion of its length as indicated at 85' and which other end opens through the end of the lug which is remote from the chambered housing.

The lug 84 has formed in the surface thereof an encircling groove 86 which is in communication with a number of radial passages 87 which lead from the larger part of the bore 85 were it joins the reduced portion 85'.

The body 79 is encircled at the inner end of the lug portion 84, by a flange or collar 88 which is in a plane passing transversely of the body between the radial passage 87 and the inner end of the axial chamber 82 so that when the valve is mounted with the chamber portion of the housing body 79 in the opening 77, the flange will abut the inner side of the wall 76, placing the lug 84 within the tank and also placing the radial passages 87 at the inner side of the tank wall as illustrated.

The lug 84 is of reduced exterior diameter at the free end thereof as indicated at 89, thereby forming a shoulder 90 which is spaced longitudinally of the lug from the passages 87 and between this shoulder and the radial passages the lug is provided with the encircling undercut channel 91 for the purpose hereinafter set forth.

At the end of the passage 85 which opens into the chamber 82 the wall forming the bottom of the chamber is provided with an annular recess 92 which is concentric with the passage 85 and opens thereinto and into this annular recess is fitted a rubber seat gasket 93.

Extending through the passage 85 and the reduced portion 85' thereof is a valve stem 94 which carries the slotted head 95 at the end thereof which extends beyond the free end of the lug 84, while at its opposite end this stem is reduced in diameter as indicated at 94' and has fitted thereon a valve disk 96 which is of a diameter to engage against the opposing face of the seat gasket 93. This valve disk is maintained in position by a suitable nut 97 which is threaded upon the reduced end portion of the stem and between which and the valve disk may be interposed a suitable lock washer 98.

The stem 94 is adapted to have reciprocatory movement in the axial passage in which it is mounted, fitting snugly in the reduced portion 85' thereof, but being spaced from the wall of the larger portion 85 so that when the valve disk 96 is off of the seat 93, fluid may pass from the valve chamber 82 through the larger portion of the passage to the radial passages 87 for discharge into the tank through the hereinafter described port.

Encircling the reduced portion 89 at the inner end of the lug 84 is a coil spring 99 which rests upon the shoulder 90 and at its other end engages under the head 95 of the valve stem. This spring constantly urges the stem to move in a direction to draw the valve element 96 into closing engagement with the seat gasket 93.

The numeral 100 generally designates the swivel head body which is mounted upon the lug 84. This swivel head body is cylindrical in form and has the circular bore 101 formed axially therethrough as shown, to receive in one end, which will be designated the inner end, the circular lug 84. At its inner end the bore 101 is of enlarged or increased diameter as indicated at 102 and this portion of increased inside diameter encircles the annular recess 86 and bears against the opposing inner side or face 86ª of the circular flange or collar 88. Thus the wall of the cylindrical head, in that portion in which the bore is enlarged, cooperates with the annular recess to form a circular passageway into which the radial passages open and this portion of the wall of the head is provided with a discharge port 103 which communicates with the circular passageway 86ᵇ as shown. Thus it will be seen that the head may be rotated to any desired extent on the lug and the outlet port 103 will always be in communication with the larger part of the bore 85 to receive liquid therefrom for discharge into the tank.

The cylindrical head body 100, of course, encircles the undercut channel 91 and it carries a set screw 104 which is positioned for extension into the channel 91 to engage the bottom of the channel and thus hold the cylindrical head body against detachment from the lug. However, it will be seen that when the set screw is backed off slightly, the head body can be rotated as desired, while at the same time being maintained against complete detachment from the lug, and after the head body has been rotated to the desired extent it can be fixed by moving the set screw back into engagement with the wall of the undercut recess.

The outer end of the cylindrical head body is provided with the transversely aligned slots 105 and disposed across the outer end of the head body and lying in these slots is an end portion 106 of a float arm which is generally designated 107. This float arm is here shown as being in one piece and as having the portion 106 at right angles to a second portion 108 and having a float ball 109 secured to the free end of this second portion. However, this float arm may be made in two parts, if desired, in the same way as the arm 48 so that the angle between the portions 106 and 108 may be changed if and when found desirable.

Extending transversely through the arm portion 106 adjacent to the free end thereof and at one side of the longitudinal center of the cylindrical head body, is a pivot pin 109 upon which the arm rocks. The pivoted end of the float arm is adapted to engage the head 95 of the valve stem 94 when the arm swings on its pivot toward the head to apply axial thrust to and shift the stem against the resistance of the spring 99 and move the valve disk off of its seat to permit liquid flow through the seat to the radial passages 87. It will be seen that when the valve disk is off of its seat and liquid is flowing through the valve, it will sweep across the seat gasket and thus keep the same clean so that when the valve disk is returned to its closing position a tight closing contact with the seat will be effected. This return movement of the valve disk, when the float has been elevated by liquid rising in the tank so as to cause the pivoted thrust arm portion 106 to swing away from the adjacent end of the valve stem, will tend to move the valve disk onto its seat and this action will also be assisted by the reaction of the compressed spring 99.

It will be seen from the foregoing that while the movement of the valve element in this last mentioned embodiment is opposite to the valve elements of the preceding forms or embodiments, in that it opens against the pressure of the inflowing liquid instead of with it, as in the first cases, the swivel connection between the head body to which the float arm is pivotally connected and the chambered valve housing is of the same character whereby desired angular adjustments of the float arm may be made to locate the float in the most desirable or effective position within the tank.

From the foregoing, it will be apparent that there is provided, by the present invention, a new and novel float actuated valve of relative simple construction and having a simple and readily adjusted means for setting the float arm in any desired angular position in the tank, within certain limits to facilitate the installation of the valve.

I claim:

1. A valve comprising a body, a valve element chamber therein and opening through a side of the body, means for attaching the body to a pipe, a flow passage in the body leading from said means and having an end opening in said chamber, a valve element movably supported in said chamber and adapted to cover and close the said end of the flow passage when moved toward the same, an annular head having an end swivelly attached to the body and closing the opening of the chamber, an opposite end of the head having a slot therein and lying diametrically thereacross, said valve element including a stem and the head including a guide for the stem, the stem having an end extending into the slot, an elongate valve actuator pivotally coupled at one end to the head at one end of and lying in the slot across the said end of the valve stem to effect movement of the valve element when swung on its pivot in one direction, a float, and means coupled with and actuated by and upon movement of the float in one direction to move the actuator relative to the stem, and a fluid outlet for the chamber.

2. A valve according to claim 1, wherein said valve element includes a packing disc, and said end of the flow passage has a valve seat flange therearound carried by the body and upon which the packing disc engages.

3. A valve comprising a body part and a tubular stem part adapted for mounting the valve in operative position, said body part having a chamber therein opening at one side through a side of the body, a flow passage communicating the stem with the chamber, a head part over and closing the open side of the chamber and having a reduced extension disposed in the chamber for rotation therein, means for securing the head part in a position of rotary adjustment relative to the body part, said head and extension having an axial passage therethrough, a valve element having a part in the chamber adapted to close the flow passage and a stem reciprocable in said axial passage, a float rod having an end pivotally attached to said head part for rocking movement and arranged and adapted when rocked in one direction to apply thrust to the outer end of the valve stem to move the valve part into closing relation with said passage, a float coupled to said rod, and a fluid outlet for said chamber.

4. A float operated valve comprising a body part and a tubular mounting stem part, the body part having a valve chamber therein, the chamber having an open side, a flow passage connected with the tubular stem and opening at one end into the chamber toward the open side of the chamber, a substantially cylindrical swivel head lying over and closing said open side of the chamber, a lug integral with the head and extending into and fitting in the chamber and adapted to rotate therein for rotatable adjustment of the head, means for securing the head in a position of rotary adjustment, the head having a diametrical slot therein and the head and lug having an axial bore therethrough opening at one end into the slot the bore opening at its other end into the chamber, a valve unit in the chamber and including a head positioned to close said one end of the flow passage and a stem reciprocably positioned in said bore and projecting into said slot, a float arm having an end lying in the slot and pivoted therein, said arm when pivoted in one direction applying thrust to the stem to close the valve, a float coupled to the arm, and a fluid exhaust passage leading from the valve element chamber through a side of the chamber.

5. The invention according to claim 4, with a thrust finger pivotally mounted in said slot between the outer end of the valve stem and the pivoted end of the arm, the arm engaging one side of the finger and the opposite side of the finger engaging the end of the valve stem.

6. The invention according to claim 4, wherein said arm comprises two rod sections having contiguous end portions and means coupling said end portions and adapted to secure the rod sections in an angular relation.

7. The invention according to claim 4, wherein said body part and stem part are each of elongate form and in aligned relation and are embodied in a single unit, said chamber open side being directed through the end of the body part remote from the stem part, and said arm having the end thereof which is connected to the head extending transversely of the length of the unit.

8. The invention according to claim 4, wherein said body part and stem part are each of elongate form and in aligned relation and are embodied in a single unit, said chamber open side being directed laterally through the side of the body part and the axis of rotation of the lug being perpendicular to the longitudinal axis of the unit, and said arm comprising a rod adapted to swing with the swivel head in a plane parallel with the said longitudinal axis of the unit.

9. A valve comprising a main body, a fluid flow passage therethrough having an inlet end and an outlet end, means for connecting a fluid supply pipe with said inlet, end, valve means for controlling fluid flow through said passage and including a valve element and a reciprocably mounted stem, a head body, a circular lug carried by one of said bodies, the other one of said bodies being formed to receive said lug, said lug having an undercut encircling channel therein providing a sloping outwardly facing surface, a set screw carried by said other body in position for engagement against said sloping surface, said screw and lug coacting to permit swivelling of the head body relative to the main body, a valve actuating arm having one end pivotally attached to the head body, and said stem being positioned relative to the pivoted end of said arm whereby the arm upon swinging in one direction applies axial thrust to the stem to shift the valve element.

10. A valve structure comprising an elongate body comprising an outer end portion having a chamber opening through the end thereof to receive an end of a fluid supply pipe and an inner end lug portion, a bore extending through the lug portion and opening at one end into said chamber, a lateral passage leading from the bore through a side of the lug portion, a valve stem extending through said bore, a valve element on one end of the stem in the chamber for closing the adjacent end of the bore, the bore being of larger diameter than the stem from the end opening into the chamber to the lateral passage, a head body having a bore therethrough open at both ends, the head having said lug extended into the bore thereof from one end, means coupling the head and lug by which the head can be swivelly adjusted on and secured to the lug, said valve stem having its other end terminating in the head bore adjacent to the other end thereof, an arm having an end disposed across the said other end of the head bore, and a pivot between said end of the arm and the head, the arm functioning when swung in one direction to engage the said other end of the valve stem and move the stem to valve open position.

11. The invention according to claim 10, with a coil spring encircling the valve stem adjacent to said other end, said spring being connected at one end with the lug and connected at its other end with the stem and urging the stem in a direction to close the valve.

12. The invention according to claim 10, wherein said head and lug coupling means comprises an undercut groove encircling the lug and a set screw carried by the head in position to enter the channel when threaded inwardly.

13. The invention according to claim 10, with a channel encircling said lug and having said lateral passage opening thereinto, said head body encircling and covering the channel, and the head body having a port in the portion of the wall thereof covering the channel for discharging fluid from the channel.

14. A valve comprising an elongate body having an outer end portion and an inner end portion, an axial passage through the body, the end of the passage in the outer end portion being the valve inlet, a valve seat encircling the passage intermediate the ends of the passage, an outlet port leading radially from the passage on the side of the seat remote from said inlet, a swivel body having one end formed with a transverse slot, the other end of the swivel body and the inner end portion of the elongate body having telescoping interengaging relation providing opposing circular surfaces, one of the bodies having a circumferential binding screw engaging sloping shoulder in the circular surface thereof oblique to the axial passage, a binding screw carried by the other body and projecting from the said circular surface thereof and bearing upon said sloping shoulder, a reciprocable stem in said axial passage and terminating within the swivel body adjacent to said slot, a valve element carried by the stem for engagement on said seat, an elongate thrust member for said stem extending across the swivel body and lying in said slot across and in contact with the said terminal end of the valve stem, and pivot means in the slot for said thrust member, said thrust member when oscillated in one direction on its pivot applying longitudinal thrust to the stem.

15. The invention according to claim 14, wherein the interengagement of the said other end of the swivel body and the inner end portion of the elongate body is effected by a circular lug extending from and forming a part of the swivel body and fitting into the axial passage of said inner end portion, the binding screw engaging sloping shoulder forming the entire side face length of the lug.

16. The invention according to claim 14, wherein the said swivel body is tubular and the said interengagement of the same with the inner end portion of the elongate body is effected by the extension of said inner end portion into an end of the tubular swivel body, the binding screw engaging sloping shoulder being formed in the said inner end portion on the side of the outlet portion remote from the valve seat.

17. A valve comprising an elongate body having an outer end portion and an inner end portion, an axial passage through the body, the end of the passage in the outer end portion being the valve inlet, a valve seat encircling the passage intermediate the ends of the passage, an outlet port leading radially from the passage on the side of the seat remote from said inlet, a swivel body having one end formed with a transverse slot, the other end of the swivel body and the inner end portion of the elongate body having telescoping interengaging relation providing opposing circular surfaces, one of the bodies having a circumferential binding screw engaging sloping shoulder in the circular surface thereof oblique to the axial passage, a binding screw carried by the other body and projecting from the said circular surface thereof and bearing upon said sloping shoulder, a reciprocable stem in said axial passage and terminating within the swivel body adjacent to said slot, a valve element carried by the stem for engagement on said seat, an elongate thrust member for said stem extending across the swivel body and lying in said slot across the said terminal end of the valve stem, and pivot means in the slot for said thrust member, said thrust member being adapted when oscillated in one direction on its pivot to apply longitudinal thrust to the stem to move the valve element relative to its seat.

References Cited in the file of this patent

UNITED STATES PATENTS

| | | |
|---|---|---|
| 529,739 | Long | Nov. 27, 1894 |
| 774,194 | Morency | Nov. 8, 1904 |
| 948,519 | Neal | Feb. 8, 1910 |
| 1,612,350 | Berry | Dec. 28, 1926 |
| 1,962,991 | Laux | June 12, 1934 |
| 2,106,512 | Woolley | Jan. 25, 1938 |
| 2,520,573 | Smith et al. | Aug. 29, 1950 |